United States Patent [19]
Hirai et al.

[11] Patent Number: 5,362,426
[45] Date of Patent: Nov. 8, 1994

[54] NUCLEAR FUEL PELLETS AND METHOD OF MANUFACTURING THE SAME

[75] Inventors: Mutsumi Hirai, Mito; Shinji Ishimoto, Orarai; Kenichi Ito, Katsuta, all of Japan

[73] Assignee: Nippon Nuclear Fuel Development Co., Ltd., Ibaragi, Japan

[21] Appl. No.: 70,214

[22] Filed: Jun. 2, 1993

Related U.S. Application Data

[60] Continuation of Ser. No. 895,665, Jun. 9, 1992, Pat. No. 5,255,299, which is a division of Ser. No. 674,170, Mar. 25, 1991, Pat. No. 5,180,527.

Foreign Application Priority Data

Apr. 3, 1990 [JP] Japan ................................. 2-87579
Nov. 5, 1990 [JP] Japan ................................ 2-297082

[51] Int. Cl.⁵ .............................................. G21C 21/00
[52] U.S. Cl. .................................. 264/0.5; 252/638; 376/261; 376/421; 376/423; 376/429; 501/906; 264/56
[58] Field of Search ............... 376/261, 421, 423, 419; 264/0.5, 56; 252/638; 501/906

[56] References Cited

U.S. PATENT DOCUMENTS

| | | | |
|---|---|---|---|
| 2,818,605 | 1/1958 | Miller | 501/94 |
| 2,979,399 | 4/1961 | Angier | 419/47 |
| 3,063,794 | 11/1962 | Grimes et al. | 423/252 |
| 3,211,812 | 10/1965 | Johnson et al. | 264/0.5 |
| 3,366,576 | 1/1968 | Meyer et al. | 252/638 |
| 3,442,762 | 5/1969 | Denton | 376/411 |
| 3,708,432 | 1/1973 | Triggiani et al. | 252/637 |
| 3,715,273 | 2/1973 | Rigby et al. | 376/421 |
| 3,723,581 | 3/1973 | Boettcher et al. | 264/0.5 |
| 3,825,499 | 7/1974 | Johnson | 252/638 |
| 3,849,329 | 11/1974 | Cahoon, Jr. | 252/628 |
| 3,862,908 | 1/1975 | Fitch et al. | 252/635 |
| 3,865,746 | 2/1975 | Rubin et al. | 252/637 |
| 3,867,489 | 2/1975 | Rubin | 264/0.5 |
| 3,872,022 | 3/1975 | De Hollander et al. | 252/638 |
| 3,879,820 | 4/1975 | Sandi | 423/5 |
| 3,923,933 | 12/1975 | Lay | 264/0.5 |
| 4,430,276 | 2/1984 | Radford et al. | 264/0.5 |
| 4,512,939 | 4/1985 | Dörr et al. | 264/0.5 |
| 4,869,867 | 9/1989 | Lay et al. | 376/421 |

FOREIGN PATENT DOCUMENTS

| | | |
|---|---|---|
| 55-027939 | 2/1980 | Japan . |
| 55-027941 | 2/1980 | Japan . |
| 1107193 | 4/1989 | Japan . |
| 1198051 | 7/1970 | United Kingdom . |

*Primary Examiner*—Donald P. Walsh
*Assistant Examiner*—Ngoclan T. Mai
*Attorney, Agent, or Firm*—Oblon, Spivak, McClelland, Maier, & Neustadt

[57] ABSTRACT

The present invention provides improved nuclear fuel pellets having high thermal conductivity for use in an LWR. This can be achieved by creating a continuous deposition phase of high-thermal conductivity substances in the grain boundaries in the pellets. As a result, the temperature in the center of the fuel rod can be significantly reduced, and the discharge amount of gases generated on the nuclear fission can be efficiently reduced.

The present invention also provides a method of manufacturing the above-described nuclear fuel pellets.

12 Claims, 4 Drawing Sheets

NUCLEAR FUEL PELLETS AND METHOD OF MANUFACTURING THE SAME

This is a continuation, of application Ser. No. 07/895,665, filed on Jun. 9, 1992, U.S. Pat. No. 5,255,299, which is a division of application Ser. No. 07/674,170, filed on Mar. 25, 1991, U.S. Pat. No. 5,180,527.

BACKGROUND OF THE INVENTION

1. Field of the Invention

This invention relates to a nuclear fuel pellets to be loaded into an LWR (light water reactor), and more particularly to nuclear fuel pellets having high thermal conductivity and a method of manufacturing the same.

2. Description of the Prior Art

At present, in the LWR, there have been made plans for economical improvement, i.e., plans to achieve highly efficient combustion of nuclear fuel and to produce higher output therefrom.

Under such circumstances, main disadvantageous phenomena in the design of a fuel rod are as follows:

(1) a temperature increase in the center of the fuel rod;

(2) An increase in the discharge amount of gases generated on the nuclear fission in the fuel red; and (3) the interactions between the fuel pellets and the containing tube thereof.

In particular, (1) a temperature increase in the center of the fuel rod has most significantly adverse effects on other fuel behaviors.

A conventional nuclear fuel rod will be described with reference to a schematic configuration shown in FIG. 4. In FIG. 4, a conventional nuclear fuel rod 6 comprises nuclear fuel pellets 1, a containing tube 2 that contains the fuel pellets 1, an upper-end plug 3, a lower-end plug 4 and a plenum spring 5. The nuclear fuel pellets 1 are oxide pellets made of uranium oxide or mixed oxide, to which gadolinium oxide is added as a nuclear toxic substance.

Both the uranium oxide and the mixed oxide inherently have low thermal conductivity, and the addition of gadolinium oxide makes their thermal conductivities still lower. Thus, when the output of the fuel rod is increased, the temperature in the center of the fuel rod increases. As a result, the discharge amount of gases generated on the nuclear fission in The fuel rod is increased.

On the other hand, in order to enhance the mechanical strength of the nuclear fuel rod, high strength fibriform substances are uniformly dispersed in the ceramic that constitutes nuclear fuel pellets. This technique has been known to those skilled in the art (see Japanese Patent Laid-open Publication No. 53-16198).

More specifically, metallic fiber and beryllium oxide fiber and whisker are used as high strength fibriform substances. Such fiber and whisker also have high thermal conductivity, so that they can serve to increase the thermal conductivity of the nuclear fuel pellets. However, the fiber and whisker are added to the ceramic, which constitutes the nuclear fuel pellets, in a dispersed fashion. Thus, the thermal conductivity of the nuclear fuel pellets cannot be increased significantly. As a result, the above-described disadvantages, which arise along with the output increase of the fuel rod, cannot be effectively reduced.

Further, another example has been disclosed in High Temperature-High pressures. Specifically, molybdenum metal is deposited in the grain boundaries of uranium oxide in order to increase the thermal conductivity of the nuclear fuel pellets. However, it is extremely difficult to manufacture such nuclear fuel pellets as indicated in this literature by use of an ordinary industrial technique.

SUMMARY OF THE INVENTION

Accordingly, one object of the present invention is to provide nuclear fuel pellets that have improved in thermal conductivity, decreased the temperature in the center of the nuclear fuel rod, and reduced the discharge amount of gases generated on the nuclear fission in the fuel rod.

Another object of the present invention is to provide a method of manufacturing The above-described nuclear fuel pellets.

Briefly, in accordance with one aspect of The present invention, there are provided nuclear fuel pellets which comprises sintered grains including nuclear fuel substances, The nuclear fuel pellets having a deposition phase of high-thermal conductivity substances deposited continuously in the grain boundaries of the sintered grains.

BRIEF DESCRIPTION OF THE DRAWINGS

A more complete appreciation of the invention and many of the attendant advantages thereof will be readily obtained as The same becomes better understood by reference to the following detailed description when considered in connection with The accompanying drawings, wherein.

DESCRIPTION OF THE PREFERRED EMBODIMENTS

In the nuclear fuel pellets according to the present invention, a deposition phase of substances having high thermal conductivity is continuously present in the grain boundaries in the pellets. Thus, the thermal conduction in the pellets is efficiently performed through the continuous deposition phase. As s result, the average thermal conductivity of The pellets is increased, and then the distribution of temperature in the pellets becomes more uniform than that of the conventional nuclear fuel pellets.

Further, the nuclear fuel pellets according to the present invention are manufactured in The following manner. Specifically, high-thermal conductivity substances, at least a part of which liquefies at a temperature near or below the sintering temperature thereof, are added to nuclear fission substances, and sintered. Thus, the high-thermal conductivity substances are melted into liquid when they are sintered. As a result, the thus liquefied substances are deposited in the grain boundaries of uranium oxide or mixed oxides, and become continuous grain layers after cooling.

Moreover, the following substances are preferable as the above-described high-thermal conductivity substances. Specifically, they include beryllium oxide alone, or a mixture of beryllium oxide and at least one of or one oxide of titanium, gadolinium, calcium, barium, magnesium, strontium, lanthanum, yttrium, ytterbium, silicon, aluminum, samarium, tungsten, zirconium, lithium, molybdenum, uranium, and thorium or an eutectic matter being obtained by heating the above mixture, whereby the melting point thereof being decreased.

Hereinafter, nuclear fuel pellets of embodiments according to the present invention will be described with reference to the accompanying drawings.

Figure 1:
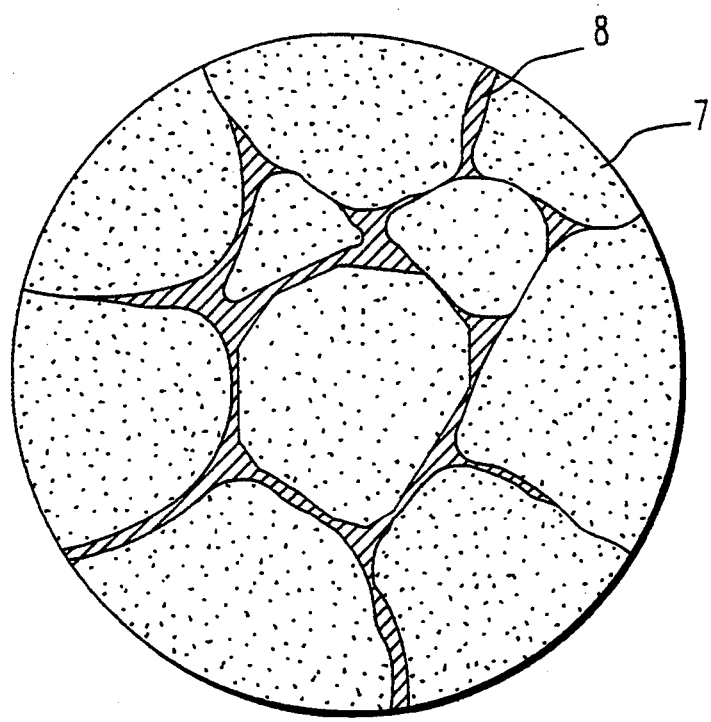
FIG. 1 is an enlarged schematic diagram illustrating one of nuclear fuel pellets, which is observed commonly in respective embodiments according To the present invention.

FIG. 1 is an enlarged schematic diagram illustrating one of nuclear fuel pellets, which is observed commonly in respective embodiments according to the present invention. In FIG. 1, a deposition phase 8 of substances having high thermal conductivity is continuously deposited in the grain boundaries of nuclear fission substances 7.

First Embodiment

Figure 2:
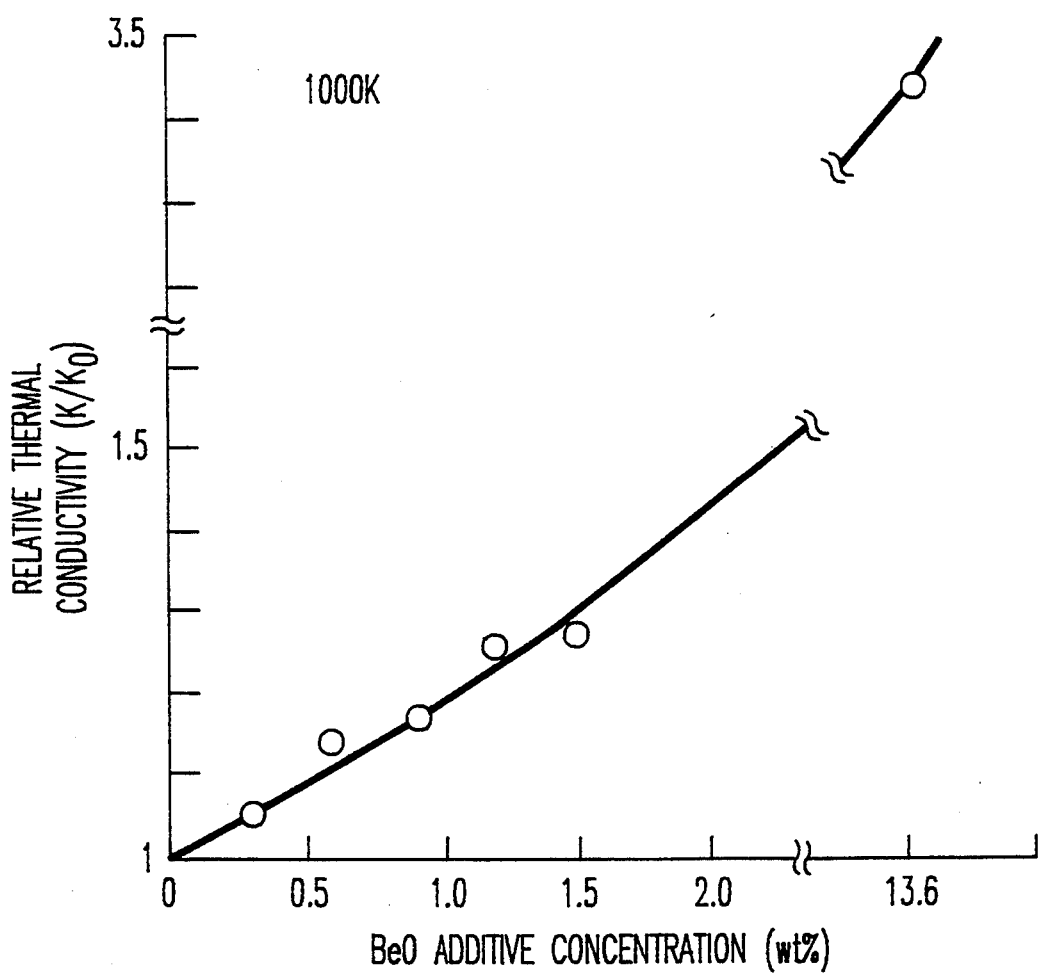
FIG. 2 is a graph illustrating the relationship between The concentration of beryllium oxide added to the pellets and the relative thermal conductivity thereof in a first embodiment according to the present invention.

Beryllium oxide (BeO) powder was added to uranium oxide ($UO_2$) powder, and mixed therewith. The amount of beryllium oxide was 1.5 wt % at a maximum (5.0 vol % at a maximum) with respect to the total amount of the uranium oxide powder and the beryllium oxide powder. The thus mixed powder was molded by pressing with a pressure of about 2.5 through about 3.0 $t/cm^2$, and a mold of about 50 through about 55% TD was obtained. The mold was sintered at about 2100° C., the temperature being higher than the eutectic point thereof. As a result, pellets having an average grain diameter of about 110 through 160 μm were obtained. In the process of sintering, at least a part of the pellets liquefied and covered at least half the grain boundaries. As the grain boundary-covering factor of the thus liquefied pellets increases, the thermal conductivity of the pellets increases monotonously. Next, the relative thermal conductivities of such pellets were measured varying the amount of beryllium oxide to be added. The measurements thereof are shown in FIG. 2.

Second Embodiment

Beryllium oxide powder and titanium oxide powder were mixed, and the mixture thereof was melted at a temperature higher than the eutectic point thereof, and then ground. The thus ground powder was mixed with uranium oxide powder, and molded by pressing with a pressure of about 2.5 through 3.0 $t/cm^2$. Thereafter the thus obtained mold was sintered in a reduction atmosphere at about 1700° C., the temperature being higher than the eutectic point (about 1670° C.). As a result, pellets having an average grain diameter of about 50 through about 110 μm were obtained.

In this embodiments, the beryllium oxide powder and the titanium oxide powder were added to the uranium oxide powder in the following proportions expressed by wt % with respect to the total amount of the pellets:

| Beryllium oxide powder | Titanium oxide powder |
| --- | --- |
| 1.5 wt % | 1.0 wt % |
| 3.0 wt % | 2.0 wt % |

-continued

| Beryllium oxide powder | Titanium oxide powder |
| --- | --- |
| 1.0 wt % | 1.0 wt % |
| 1.0 wt % | 4.0 wt % |
| 1.0 wt % | 8.0 wt % |

Figure 3:
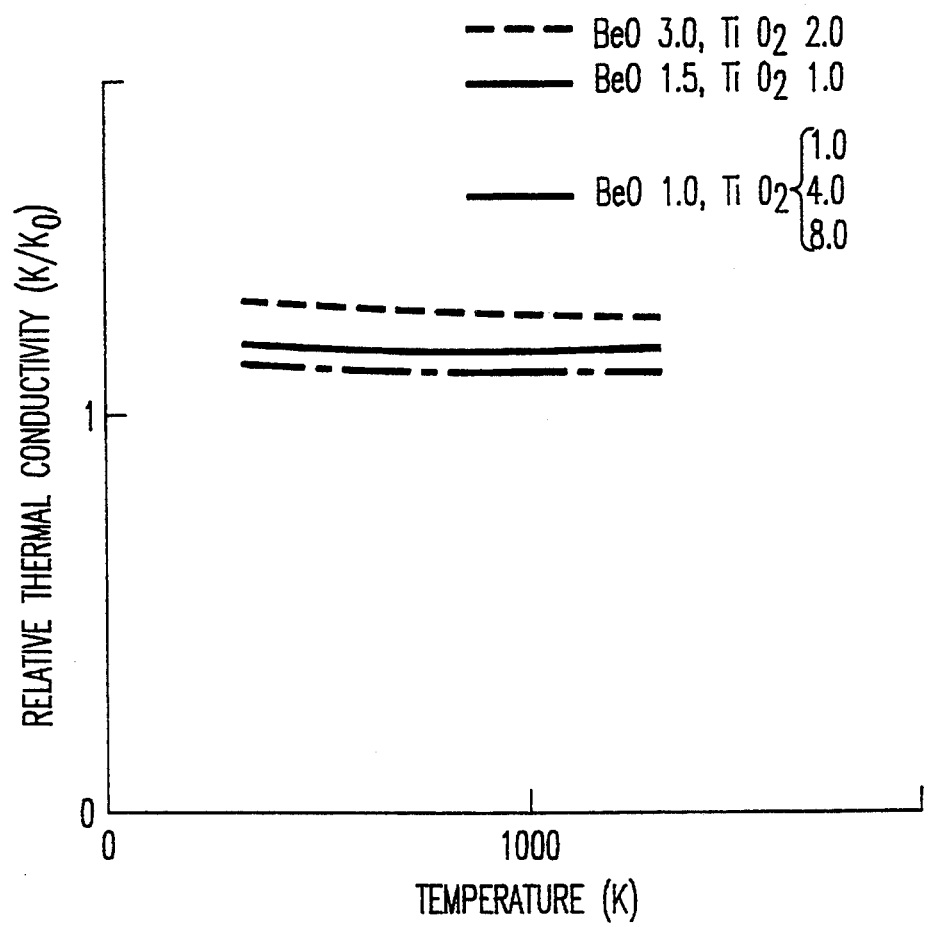
FIG. 3 is a graph illustrating the comparison of the thermal conductivity of the pellets in a second embodiment according to the present invention and that of the conventional pellets.
Figure 4:
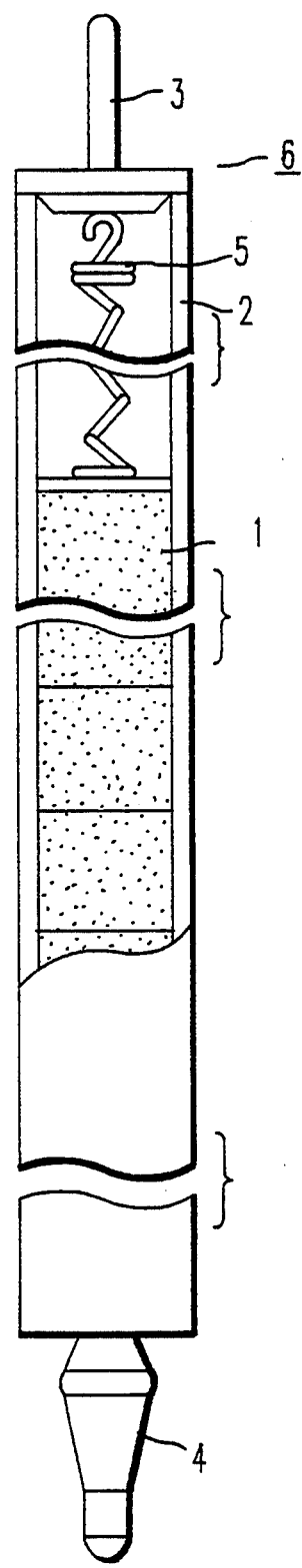
FIG. 4 is a cross-sectional view illustrating a conventional nuclear fuel rod.

The thermal conductivities (K) of the pellets obtained by use of the above-described proportions were compared with the thermal conductivity (Ko) of conventional pellets. The comparison results are shown in FIG. 3.

Third Embodiment

Beryllium oxide powder and gadolinium oxide powder were mixed, and the mixture thereof was melted at a temperature high than the eutectic point thereof, and then ground. The thus ground powder was mixed with uranium oxide powder, and molded by pressing with a pressure of about 2.5 through about 3.0 $t/cm^2$. Thereafter, the thus obtained mold was sintered in a weak oxidation atmosphere (moist hydrogen of an oxidation potential of about −300 kJ/mol) at about 1700° C., the temperature being higher than the eutectic point (about 1500° C.). As a result, pellets having an average grain diameter of about 15 through about 20 μm were obtained. The thermal conductivity of the thus obtained pellets was about 1.11 through about 1.13 times that of the conventional pellets such that gadolinium oxide powder of about 10 wt % was added to the uranium oxide powder (the comparison was made at a temperature of about 1000 K.).

In this embodiment, the adding proportions of the beryllium oxide powder and the gadolinium oxide powder to the uranium oxide powder were about 1.5 wt % and about 1.0 wt %, respectively to the total amount of the pellets.

Fourth Embodiment

Beryllium oxide powder and silicon oxide powder were mixed, and the mixture thereof was mixed with uranium oxide powder. The thus mixed powder was molded by pressing with a pressure of about 2.5 through about 3.0 $t/cm^2$. Thereafter, the thus obtained mold was sintered in a reduction atmosphere at about 1700° C., the temperature being higher than the eutectic point (about 1670° C.). Further, besides the above, beryllium oxide powder and silicon oxide powder were mixed, and the mixture thereof was melted at a temperature higher than the eutectic point, and then ground. The thus ground powder was mixed with uranium oxide powder, and the mixture thereof was sintered in the same manner as above. As a result, pellets having an average grain diameter of about 40 through 50 μm were obtained. The thermal conductivity of the thus obtained pellets was about 1.08 times that of the conventional pellets of uranium oxide (the comparison was made at a temperature of 1000 K.).

In this embodiment, the beryllium oxide powder and the silicon oxide powder were added to the uranium oxide powder in the following proportions expressed by wt % with respect to the total amount of the pellets:

| Beryllium oxide powder | Silicon oxide powder |
| --- | --- |
| 0.9 wt % | 0.1 wt % |
| 0.9 wt % | 0.3 wt % |

Fifth Embodiment

Beryllium oxide powder and aluminum oxide powder were mixed, and the mixture thereof was mixed with uranium oxide powder. The thus mixed powder was molded by pressing with a pressure of about 2.5 through 3.0 t/cm². Thereafter, the thus obtained mold was sintered in a reduction atmosphere at about 1900° C. or about 2000° C., the temperatures being higher than the eutectic point (about 1840° C.). Further, besides the above, beryllium oxide powder and aluminum oxide powder was mixed, and the mixture thereof was melted at a temperature higher than the eutectic point, and then ground. The thus ground powder was mixed with uranium oxide powder, and the mixture thereof was sintered in the same manner as above. As a result, pellets of two different kinds were obtained. Specifically, the thermal conductivity of the pellets obtained by sintering at about 1900° C. was about 1.08 times that of uranium oxide. Further, the thermal conductivity of the pellets obtained by sintering at about 2000° C. was about 1.12 times that of uranium oxide (the comparison was made at a temperature of 1000 K.).

In this embodiment, the beryllium oxide powder and aluminum oxide powder were added to the uranium oxide in the following proportions expressed by wt % with respect to the total amount of the pellets:

| Beryllium oxide powder | Aluminum oxide powder |
| --- | --- |
| 0.9 wt % | 0.1 wt % |
| 0.9 wt % | 0.3 wt % |

Further, the average grain diameters in the case of 0.9 wt %—beryllium oxide powder and 0.1 wt %—aluminum oxide powder were as follows depending on the sintering temperatures;
about 60 μm when sintered at about 1900° C., and
about 110 μm when sintered at about 2000° C.

Moreover, the average grain diameters in the case of 0.9 wt %—beryllium oxide powder and 0.3 wt %—aluminum oxide powder were as follows depending on the sintering temperatures;
about 90 μm when sintered at about 1900° C., and
about 140 μm when sintered at about 2000° C.

Sixth Embodiment

Beryllium oxide powder, titanium oxide powder and gadolinium oxide powder were mixed, and the mixture thereof was melted at a temperature higher than the eutectic point, and then ground. (Besides this, the mixture thereof was not melted depending on conditions). The thus obtained powder was mixed with uranium oxide powder, and this mixed powder was molded by pressing. Thereafter, the thus obtained mold was sintered in a weak oxidation atmosphere. The average grain diameter was about 30 μm, and the thermal conductivity of the thus obtained pellets was about 1.11 through 1.13 times that of the conventional pellets consisting of uranium oxide and gadolinium oxide.

In this embodiment, the beryllium oxide powder, titanium oxide powder and gadolinium oxide powder were added to the uranium oxide powder in the following proportions expressed by wt % with respect to the total amount of the pellets:

| Beryllium oxide powder | Titanium oxide powder | Gadolinium oxide powder |
| --- | --- | --- |
| 1.5 wt % | 0.5 wt % | 10 wt % |
| 1.5 wt % | 1.0 wt % | 10 wt % |

In all of the above-described embodiments, a part of the additive substance having high thermal conductivity is liquefied during the sintering. Further, at least a half of the grain boundaries is continuously covered with the thus liquefied high-thermal conductivity substance. As the grain boundary-covering factor of the liquefied substance increases, the thermal conductivity of the pellets increases monotonously. In all cases, when the pellets have the same density, the thermal conductivity thereof is increased in proportion to the increase of the amount of the additives. Further, even when a very small amount of additive (e.g., beryllium oxide of 0.3 wt %) is added, high-density pellets can be obtained, and the thermal conductivity thereof can also be increased. Moreover, the relative densities of the molds with respect to the theoretical densities were about 50% TD. The relative densities of the thus obtained sintered pellets were about 95 through 99.7%.

Furthermore, nuclear fuel pellets having the same advantages as above can also be obtained by use of the following high-thermal conductivity substances, a part of which or the entire of which is melted at a temperature near or below their sintering temperatures. Specifically, such substances include beryllium oxide alone, or a mixture of beryllium oxide and at least one of or one oxide of barium, calcium, magnesium, strontium, aluminum, lanthanum, yttrium, ytterbium, silicon, titanium, uranium, zirconium, tungsten, lithium, molybdenum, samarium, thorium, and gadolinium.

As described above, according to the present invention, the thermal conductivity of nuclear fuel pellets can be significantly increased. Thus, the temperature in the center of the nuclear fuel rod can be reduced, whereby the discharge amount of gases generated on the nuclear fission can be efficiently reduced.

Obviously, numerous additional modifications and variations of the present invention are possible in light of the above teachings. It is therefore to be understood that within the scope of the appended claims, the invention may be practiced otherwise than as specifically described herein.

What is claimed is:

1. A method of manufacturing nuclear fuel pellets by sintering at a sintering temperature, said method consisting essentially of the steps of:

preparing a powdered high-thermal conductivity substance, wherein at least a portion of said high-thermal conductivity substance liquifies at a temperature near or below said sintering temperature and wherein said powdered high-thermal conductivity substance is beryllium oxide alone or a mixture of beryllium oxide and at least one member selected from the group consisting of titanium, gadolinium, calcium, barium, magnesium, strontium, lanthanum, yttrium, ytterbium, silicon, aluminum, samarium, tungsten, zirconium, lithium, molybdenum, uranium, and thorium oxides, or an eutectic composition obtained by heating said mixture;

adding said powdered high-thermal conductivity substance to a powdered nuclear fission substance;

mixing said powdered high-thermal conductivity substance with said powdered nuclear fission substance; and sintering the mixture thereof at a temperature higher than the temperature at which said portion of said powdered high-thermal conductivity substance liquifies.

2. The method of claim 1, wherein said powdered high-thermal conductivity substance comprises beryllium oxide of 1.5 wt. % at a maximum with respect to the total amount of the nuclear fuel pellets.

3. The method of claim 1, wherein said powdered high-thermal conductivity substance comprises a mixture of beryllium oxide of 1.5 wt. % at a maximum and titanium oxide of 8.0 wt. % at a maximum with respect tot he total amount of the nuclear fuel pellets, said mixture being melted at said sintering temperature.

4. The method of claim 1, wherein said powdered high-thermal conductivity substance comprises a mixture of beryllium oxide of 1.5 wt. % at a maximum and gadolinium oxide of 10 wt. % at a maximum with respect to the total amount of the nuclear fuel pellets, said mixture being melted at said sintering temperature.

5. The method of claim 1, wherein said powdered high-thermal conductivity substance comprises a mixture of beryllium oxide of 1.5 wt. % at a maximum and silicon oxide of 0.3 wt. % at a maximum with respect to the total amount of the nuclear fuel pellets.

6. The method of claim 1, wherein said powdered high-thermal conductivity substance comprises a mixture of beryllium oxide at 1.5 wt. % at a maximum and aluminum oxide of 0.3 wt. % at a maximum with respect to the total amount of the nuclear fuel pellets.

7. The method of claim 1, wherein said powdered high-thermal conductivity substance comprises a mixture of beryllium oxide of 1.5 wt. % at a maximum, titanium oxide of 1.0 wt. % at a maximum, and gadolinium oxide of 10 wt. % at a maximum with respect to the total amount of the nuclear fuel pellets, said mixture being melted at said sintering temperature.

8. A method of manufacturing nuclear fuel pellets by sintering at a sintering temperature, consisting essentially of the steps of:

preparing a powdered high-thermal conductivity substance, wherein said powdered high-thermal conductivity substance is a mixture of beryllium oxide and at least one oxide selected from the group consisting of titanium, gadolinium, barium, strontium, lanthanum, ytterbium, aluminum, samarium, tungsten, zirconium, lithium, molybdenum and uranium oxides, or a eutectic composition obtained by heating said mixture, wherein at least a portion of said powdered high-thermal conductivity substance liquifies at a temperature near or below said sintering temperature;

adding said powdered high-thermal conductivity substance to a powdered nuclear fission substance;

mixing said powdered high-thermal conductivity substance with said powdered nuclear fission substance to produce a mixture; and sintering said mixture at a temperature higher than the temperature at which said portion of said powdered high-thermal conductivity substance liquifies.

9. The method of claim 1, wherein said sintering temperature is about 1,700° C.

10. The method of claim 1, wherein said sintering temperature is about 1,900°–2,100° C.

11. The method of claim 8, wherein said sintering temperature is about 1,700° C.

12. The method of claim 8, wherein said sintering temperature is about 1,900°–2,100° C.

* * * * *

UNITED STATES PATENT AND TRADEMARK OFFICE
CERTIFICATE OF CORRECTION

PATENT NO. : 5,362,426
DATED : November 8, 1994
INVENTOR(S) : Mutsumi Hirai et al It is certified that error appears in the above-indentified patent and that said Letters Patent is hereby corrected as shown below:

On the title page: Item [75], line 2, "Orarai" should read --Oarai --.

Signed and Sealed this

Twenty-fifth Day of April, 1995

Attest:

BRUCE LEHMAN

*Attesting Officer*            *Commissioner of Patents and Trademarks*